Nov. 26, 1929.  F. PARISI  1,737,328
SPRING SUSPENSION FOR VEHICLE BODIES
Filed July 29, 1927

Inventor
Francesco Parisi
By Marks & Clerk
Attorneys

Patented Nov. 26, 1929

1,737,328

UNITED STATES PATENT OFFICE

FRANCESCO PARISI, OF TURIN, ITALY

SPRING SUSPENSION FOR VEHICLE BODIES

Application filed July 29, 1927. Serial No. 209,317.

This invention relates to an improved suspension system for vehicle bodies, in which the springs are of the helical type, and has for its object to provide a spring suspension which will be such as to cushion separately each of the wheels, both front and rear, unaffected by the movement of each other, thus rendering the vehicle more comfortable and lengthening its life as this suspension will absorb all shocks, whatever their direction. Another feature of the invention is that all the working parts are arranged transversely with regards to the longitudinal plane of symmetry of the vehicle. With the suspension according to the present invention, the following advantages will be obtained.

(a) Abolition of the front axle and reduction to a minimum of the non-resilient parts, both for the front and rear wheels.

(b) The vertical plane of the wheels or the set of the wheels will remain constant and unaffected by any oscillation of the wheel with regards to the vehicle, this fact permitting of a better adherence of the tires to the road, which is of advantage when braking the vehicle, etc.

(c) The system according to the invention is adapted to be easily arranged to all types of vehicle frames, and also for those specially constructed for elliptical leaf springs.

(d) Absorbing of shocks by the same resilient means, due to the provision of a double-effect absorbing device consisting of a bored piston working in an oil-filled cylinder and cooperating with the spring member above referred to, which works under compression in both directions, and contributes to the steadiness of the wheel.

(e) Greatly simplified construction, which is self-lubricating and reduction to a minimum of the necessity of inspecting from time to time the members of the springing system.

(f) With this construction, further, all noise of spring shackles is avoided and vibration is practically completely overcome, the motor vehicle having greater stability on the roads and specially in steering.

With these and other objects in view, the present invention consists in the construction and combination of parts to be fully described hereinafter and with reference to the accompanying drawing, in which an embodiment of the invention is illustrated by way of example.

Figure 1:
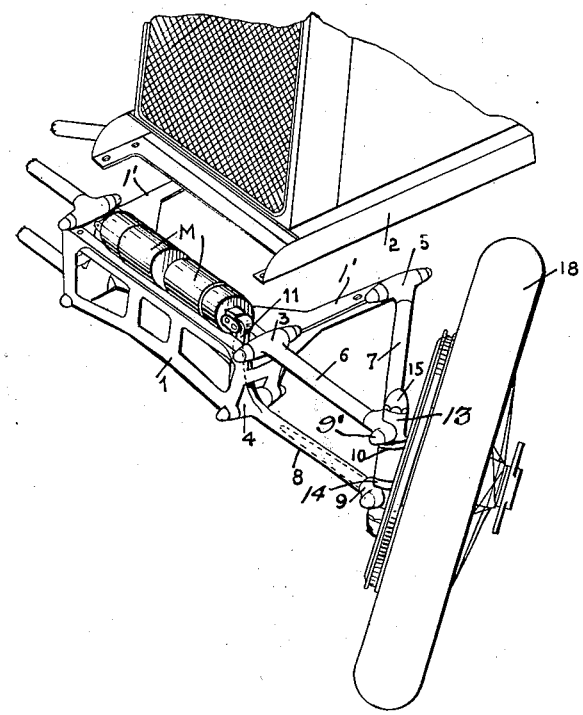
Figure 1 is a front perspective of the improved suspension system arranged on the front end of a motor car, parts being shown in a dissembled relation.
Figure 2:
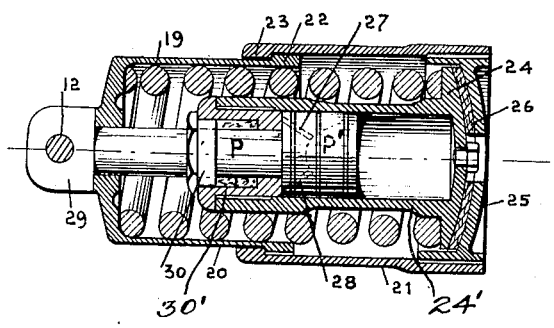
Figure 2 is a longitudinal section on an enlarged scale showing the construction of the shock-absorbing device illustrated in Figure 1.

As shown on the drawing, 2 denotes the frame of a motor vehicle to which is adapted to be secured the bracket 1. The bracket 1 consists of a main or body part to which are secured the rearwardly extending arms 1'. The bracket 1 can be secured to the under side of the frame by rivets or bolts passing through the flanges on the body frame and the bracket parts.

Pivotally secured to the end of the bracket 1 are the links 6 and 8 at the upper and lower horizontal pivotal bearings 3 and 4 respectively. The upper link has secured to the other end thereof a link 7 which extends at an angle of less than 90° towards the side of the vehicle. This link is pivoted at 5 to the rearwardly extending arm 1', the pivotal axes of the pivot 5 and the pivot 3 being in alinement with each other.

To the ends of the link 8 is pivotally secured the member 14 on the horizontal pivot 9 and to the common end to the links 6 and 7 is secured a similar pivotal member 13, also on a horizontal pivot 9'. Between the members 13 and 14 is pivoted the member 10 on the vertical pivot 15. This member 10 carries a stub axle member on which a wheel 18 is mounted in the usual manner.

The relation of the horizontal pivotal connections 3, 4, 9 and 9' bear, when the parts above described are assembled, a relation to each other such that the axes of these pivots are at the angles of a parallelogram having the links 6 and 8 and the vertical distance between 3 and 4 and 9 and 9' equal.

This permits vertical movement of these parts but always maintains the wheel in a similar predetermined relation to the body of the vehicle, the link 7 bracing the links 6 and 8 against any tendency to move in a horizontal plane.

As a means to resiliently support the movement of the linkages securing the wheel to the bracket, there is provided a resilient compression cushioning device which is secured to the top of the bracket. This device will be described in more detail hereinafter. As means for operatively connecting the cushioning device to the linkage, the link 8 is provided with an arm 11 which extends upwardly from its pivot 4 and is secured to an operating part of the cushioning device M.

In operation when the bracket moves downwardly the link 8 moves on its pivot 4 and the arm 11 is moved transversely of the bracket 1 and in a similar relation to the cushioning device M, thereby compressing the cushioning device and resiliently cushioning the downward movement of the body. The cushioning means also includes means for retarding the upward movement of the body, so that the member M functions both as a resilient support and a shock absorber.

The specific structure of the cushioning means M will now be more particularly described. This member consists of the two part casing 20 and 21 telescoping one (20) within the other (21).

The overlapping ends of each of the sections are provided with overlying shoulders 23, 22 on the respective sections to prevent longitudinal separation of the sections.

The outer end of the section 20 is closed by an integral structure to the outside of which is secured lugs 29 between which the end of the arm 11 of the link 8 is secured by the bolt 12.

The outer end of the casing part 21 is closed by the closure member 25. A coil spring 19 is seated on the ends of the casing parts which resiliently resists movement of these parts relative to each other. Within the axis of the spring 19 is a cylinder 24' which is closed at one end and provided with a flange 24 against which an end of the spring rests. This end of the cylinder is closed and rests against the closure 25 for the casing part 21. The inner end of the casing part 20 carries a piston P having a head P' which fits the bore of the cylinder 24'. The piston P where it enters the cylinder 24' is packed by the packing 30' held by the nut 30.

The piston head P' is provided with channels 27 and 28 passing to opposite sides of the head. The cylinder 24' is filled with oil which resists movement of the piston due to the necessity of flow of the oil from one side of the piston to the other when moved in either direction. The operation of the structure so described gives a dash pot action and cushions the movement of the body when the piston is moved inwardly and acts as a shock absorber to give a slower recoil of the spring 19 when the spring tends to restore itself from a compressed to its normal condition. This in the combination above described prevents the body being thrown upwardly in a violent manner.

Having now particularly described and ascertained the nature of my said invention and in what manner the same is to be performed, I declare that what I claim is:

A spring suspension for vehicle bodies comprising a bracket member secured to the vehicle body, an extension on said bracket member, parallel links pivoted to said bracket member in a vertical plane, an axle carrying member pivoted to said links, the axes of said links being horizontal, opposite connecting distance being equal whereby a parallelogram is formed between said pivot points, a wheel mounted on said axle, spring compressed cushioning means to prevent movement of said links on said pivot, a third link pivoted on said axle carrying member and to said bracket extension, the pivot axis of said third link and bracket member being in alignment with the pivot axis of one of said first mentioned links, and said third link being formed integral at one end with the link with which its pivot axis is in alignment.

In testimony whereof I affix my signature.

FRANCESO PARISI.